United States Patent [19]

Mukai et al.

[11] Patent Number: 4,688,202
[45] Date of Patent: Aug. 18, 1987

[54] TRACKING CONTROL SYSTEM FOR AN INFORMATION REPRODUCING APPARATUS

[75] Inventors: Toshiharu Mukai, Sennan; Shinichi Tanaka, Kyoto, both of Japan

[73] Assignee: Matsushita Electric Industrial Co., Ltd., Osaka, Japan

[21] Appl. No.: 702,215

[22] Filed: Feb. 14, 1985

[30] Foreign Application Priority Data

Feb. 16, 1984 [JP] Japan .................................. 59-27524

[51] Int. Cl.⁴ ............................................. G11B 21/10
[52] U.S. Cl. ....................................................... 369/44
[58] Field of Search .................. 369/44, 45, 46, 43; 358/342; 250/201 DF, 202

[56] References Cited

U.S. PATENT DOCUMENTS

| | | | |
|---|---|---|---|
| 4,406,000 | 9/1983 | Shoji et al. | 369/44 |
| 4,484,319 | 11/1984 | Koishi et al. | 369/46 |
| 4,494,154 | 1/1985 | Akiyama | 369/46 |
| 4,506,149 | 3/1985 | Utsumi | 369/44 |
| 4,556,965 | 12/1985 | Tsunoda et al. | 369/45 |
| 4,580,255 | 4/1986 | Inoue et al. | 369/44 |

Primary Examiner—Donald McElheny, Jr.
Attorney, Agent, or Firm—Wenderoth, Lind & Ponack

[57] ABSTRACT

An information reproducing apparatus for tracking control has a high-pass filter and a low-pass filter of closed loops connected in parallel to each other and has a storage quantity control circuit which controls an input signal of the high-pass filter in response to a defect detection signal which detects a defective portion of an information recording medium and is outputted from a defect detection circuit. The storage quantity of a capacitor included in the high-pass filter, or of a storage element operable equivalently to the capacitor, is equal to the storage quantity when the high-pass filter is fed a signal having previously been fed to the high-pass filter but without its high frequency component. Even when a speed error is created in an actuator due to pulse-like noises caused by a delay in the defect detection caused by the defect detection circuits, the speed error is removable just after the defect is detected, thereby obtaining the effect such that the tracking control is not so easily disturbed by the defect and operates stably.

9 Claims, 28 Drawing Figures

TRACKING CONTROL SYSTEM FOR AN INFORMATION REPRODUCING APPARATUS

BACKGROUND OF THE INVENTION

1. Field of the Invention

This invention relates to an information reproducing apparatus for reproducing information from an information recording medium having a concentric or spiral information track on which the information is recorded.

2. Description of the Prior Art

Since the information recording medium of a concentric or spiral information track on which the information is recorded, has a high recording density, an information reproducing apparatus generally requires position controls for accurate tracking and focusing or the like. Such information recording mediums are already well known, such as the optical video disc, the digital audio disc, the data file, the no-groove electrostatic capacitance system video disc and the magnetic disc of high density and of data surface servo, which perform position control for tracking or focusing during the reproduction, thereby enabling recording and reproduction at a high density. However, when the information track disappears due to a defect on the recording medium or a large noise enters into a position control signal, the tracking or focusing control would not work, thereby, causing the track to jump to the adjacent information track. Especially, the optical digital audio disc, in which the travelling velocity of information track is slow, has a remarkable tendency to jump. In order to solve this problem, the method has hitherto been proposed which detects the defect on the information record medium and holds, during tracking the defective portion, a low frequency component value just before the defective portion.

Usually, when the defect is detected, the time delay inevitably exists, whereby the large noise often remains in the position control signal when the tracking enters the defective portion. Hence, the noise will increase tracking errors in the subsequent defective portion to result in a track jump occurring.

SUMMARY OF THE INVENTION

An object of the invention is to provide an information reproducing apparatus which is capable of performing stable tracking and focusing control regardless of the defect on the information recording medium.

An information reproducing apparatus of the invention comprises: an information reading means for reading information from an information recording medium of a concentric or spiral information track on which the information is recorded; an error detection means for detecting a position error of an information reading position by the information reading means with respect to the information track; a position control means including a closed loop for correcting the information reading position corresponding to an error signal outputted from the error detecting means; and a defect detecting means which detects a defect created when the information reading position passes a defective portion in the information recording medium, thereby outputting a defect detection signal. The position control means comprises: a high-pass filter which allows high frequency components of the error signal to pass and obtains a high frequency error signal; a low-pass filter which allows low frequency components of the error signal to pass and obtains a low frequency error signal; an adding means for adding the high frequency error signal with the low frequency error signal; and a storage quantity control means which controls the storage quantity of a storage element included in the high-pass filter so as to be a predetermined value corresponding to the defect detection signal and which sends to the high-pass filter a variation with respect to the predetermined value of storage quantity. Hence, the position control is hardly disturbed even when the information recording medium has a large defect, thereby enabling the stable tracking control and focusing control.

The above and further objects and novel features of the invention will more fully appear from the following detailed description taken in connection with the accompanying drawings.

DESCRIPTION OF THE PREFERRED EMBODIMENTS

Figure 1:
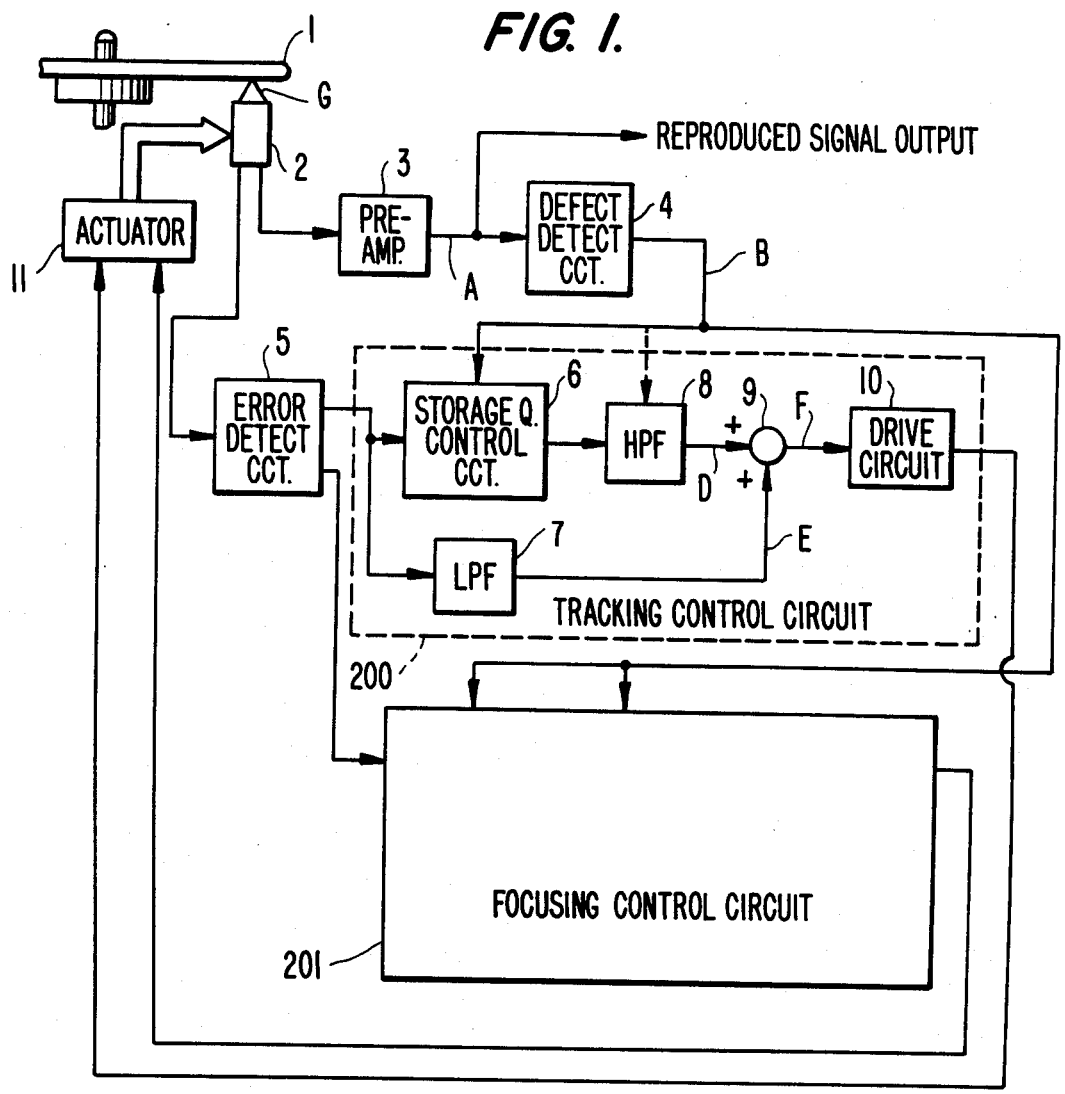
FIG. 1 is a block diagram of an embodiment of an information reproducing apparatus of the present invention.
Figure 2:
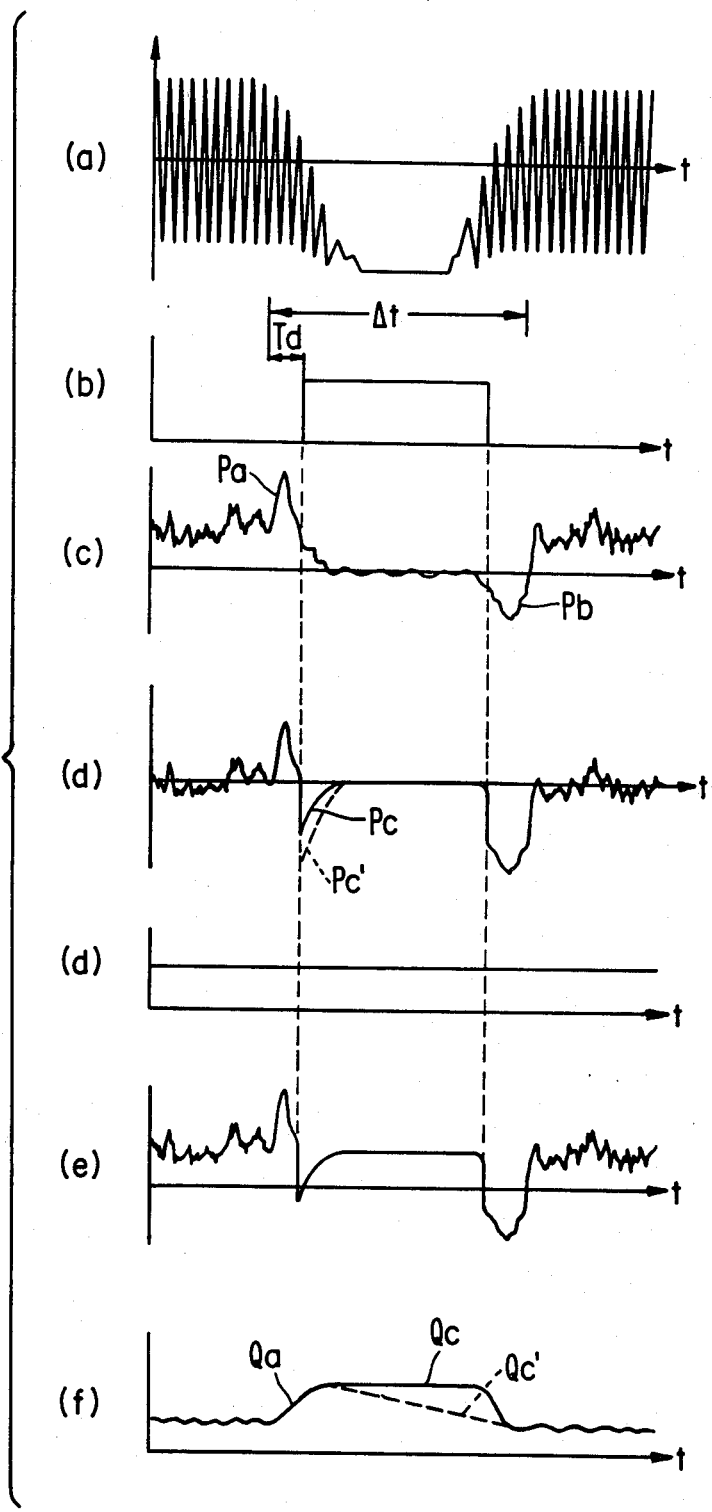
FIGS. 2($a$) through ($g$) are waveform charts of the components in the FIG. 1 block diagram respectively.

Referring to FIGS. 1 and 2($a$)–($g$), an explanation will be given on the position control means of the present invention, in which FIGS. 2($a$), ($b$), ($c$), ($d$), ($e$), ($f$) and ($g$) respectively correspond to elements A, B, C, D, E, F and G in FIG. 1.

A focusing control means 201 carries out vertical position control with respect to an information track on an information recording medium 1 and a tracking control means 200 carries out horizontal position control with respect to the same on the information recording medium 1, both the means, being slightly different from each other only in circuit constants and quite similar in essential construction. Hence, the tracking control means 200 will hereinafter be deemed to represent the position control means, thereby omitting herein description of the focusing control means 201.

At first, an explanation will be given on a case where the information recording medium 1 is traced on its not-defective but normal portion.

A reproducing head 2 reads an information signal from the information record medium 1 and outputs a tracking error detection signal for detecting a relative position error, or the tracking error, between the reproducing head 2 and the information track. This error is caused by rotation or disturbance vibration of the information record medium 1. The method to detect the tracking error may not be particularly defined, but may, for example, divide the detector for the information signal into two parts and compare detection signals from the two-divided parts. Or, in a case of using the optical information reproducing apparatus, unbalance in distribution of the quantity of the light reflected from the optical information recording medium caused by the tracking error may be detected.

An error detection circuit 5 receives the tracking error detection signal to extract the tracking error component and carries out any needed differential compensation or the like, thereby outputting a tracking error signal C. The tracking error signal C is divided by a low-pass filter 7, a storage quantity control means 6 and a high-pass filter 8, into a low frequency error signal D (the low frequency component of error signal C) and a high frequency error signal E (the high frequency component of error signal C), which are then added by an adder means 9 to be fed to a drive circuit 10. This is the same substantially as the direct application of the error signal C to an actuator 11. The output signal from the drive circuit 10 allows the actuator 11 to drive the reproducing head 2, thereby performing tracking.

On the other hand, when a defective portion on the information recording medium 1 is tracked, abnormality, such as a collapse in amplitude, appears in the reproduced signal as shown in FIG. 2(a), in which Δt represents the time when the head 2 passes through the defective portion on the record medium 1. A defect detection means 4 detects the abnormality in the reproduced signal to output a defect detection signal. Reference 3 is a pre-amplifier. While tracking the defective portion, the usual error signal is rarely obtained, and when the tracking enters into or leaves the defective portion, pulse-like noises Pa and Pb may occur. In response to the noise Pa, the head 2 is displaced from its normal tracking position as shown by Qa in FIG. 2(g). The amplitude variation of the noise Pa is stored as charges in a storage element such as a capacitor included in the high-pass filter 8 in the error signal as shown in FIG. 2(c). In response to the defect detection signal outputted during the tracking on the defective portion, a storage quantity control means 6 grounds an input of the high-pass filter 8 and the high-pass filter 8 changes its normal time constant to a smaller value by reducing the resistance value. As the result, the high-pass filter 8 produces a cancel pulse Pc, as shown in FIG. 2(d), so that the head 2 is prevented from being further displaced, as shown by Qc in FIG. 2(g). After leaving the defective portion, since the tracking control operates normally and the noise Pb acts to cancel the error caused by the noise Pa, the head 2 returns to the normal tracking position as shown in FIG. 2(g). Thus, even when the pulse-like noise remains due to a delay Td of defect detection, the speed error caused by the noise is removable just thereafter, thereby enabling stable tracking. Next, a concrete and detailed explanation will be given on an embodiment of the present invention.

Figure 3:
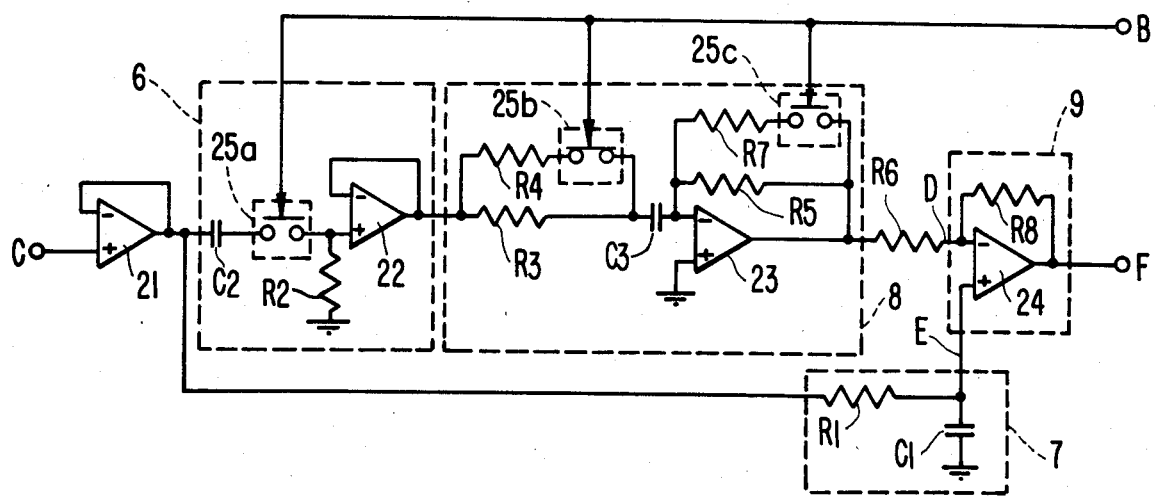
FIG. 3 is a circuit diagram of a principal portion of position control means of the embodiment of the present invention shown in FIG. 1.

Referring to FIG. 3, a resistance $R_1$ and a capacitor $C_1$ constitute a low-pass filter 7; a resistance $R_2$, a capacitor $C_2$ and an analog switch 25a constitute the storage quantity control means 6; a resistance $R_3$ or $R_4$, resistances $R_5$, $R_6$ and $R_7$, a capacitor $C_3$ and a third operational amplifier 23 constitute a high-pass filter 8. In addition, the resistance $R_2$ and capacitor $C_2$ at the storage quantity control means 6 constitute a high-pass prefilter for generating a reference value with respect to the storage quantity in the high-pass filter 8.

A first operational amplifier 21 and a second operational amplifier 22 each functions as a buffer, and a fourth operational amplifier 24 and a resistance $R_8$ constitute an adder means 9 for substantially adding the low frequency error signal and high frequency error signal. The analog switch 25a disconnects the capacitor $C_2$ of the high-pass prefilter from the resistance $R_2$ in response to the defect detection signal from a terminal B so as to thereby put the input to the high-pass filter 8 substantially at a ground potential, and at the same time, the analog switch 25b changes the time constant of the high-pass filter 8 from $R_3 \cdot C_3$ to $(R_3 \| R_4) \cdot C_3$ (where $R_3 \| R_4$ represents a parallel resistance value of resistances $R_3$ and $R_4$). Also, the analog switch 25c increases the gain of the high-pass filter 8 by $(1 + R_6/R_7)$ times in response to the defect detection signal. In FIG. 3, the analog switches 25a, 25b and 25c are shown in the state of being fed the defect detection signal. In addition, offset voltages of all the operational amplifiers always exert a constant influence on this circuit regardless of the on/off states of analog switches 25a, 25b and 25c, so that if these operational amplifiers have been adjusted to eliminate the offsets during their operation, there is no fear that a variation in the offset makes the tracking unstable when the analog switches operate in response to the defect detection signal. Hence, the operational amplifiers need not be of a small offset voltage type.

The basic principle noted above is further detailed below.

Generally, the information track is gentle in its displacement so that abrupt variations would not occur as long as the track is subjected to no abnormal vibration. The accurate tracking is performed when the actuator 11 moves exactly following the low frequency error signal. However, the actuator 11, when supplied with pulse-like noises during entry into the defective portion, is subjected to extra energy due to the noises. The pulse-like noises contain a lot of high frequency components and therefore are almost all applied to the drive circuit 10 via the storage quantity control means 6 and high-pass filter 8.

The input signal to the high-pass filter 8 is removed of its low frequency component by the storage quantity control means 6, thereby being fixed almost to the ground potential in the ideal condition free from noises.

When the defect detection means 4 detects the defect in the information recording medium 1, assuming that the pulse-like noises have previously been generated to pass through the high-pass filter 8, the stored charge quantity of the capacitor $C_2$ included in the high-pass filter 8 changes from that in the ideal condition of no noise. Accordingly, in a case where the input to the high-pass filter 8 is put at the ground potential in synchronism with the defect detection signal as shown in the FIG. 3 embodiment, a current flows to cancel variations in the stored charge quantity by the pulse-like noises present just before. Hence, the high-pass filter 8 outputs a pulse of reverse polarity (to be hereinafter called the cancel pulse) to cancel the pulse-like noises, thereby enabling the actuator 11 to be given energy to cancel the extra energy. However, in order to insure that most components of the pulse-like noises pass through the high-pass filter 8 and the low-pass filter 7 and are not affected by the noises, it is necessary to lengthen the time constants of both filters 8 and 7, whereby it takes considerable time to cancel the extra energy due to the pulse-like noises. When the defect is too large, the tracking greatly shifts while passing through the defective portion, so that the reproducing head 2 may not return to the original track after passing through the defective portion.

Hence, this embodiment, in response to the defect detection signal, the ground potential is supplied to the input of the high-pass filter 8 and the time constant of the high-pass filter 8 is reduced by switching the resistance value to a smaller value. Therefore, since the stored charge quantity at the capacitor $C_2$ of the high-pass filter changed by the pulse noise Pa is quickly recovered, the cancel pulse Pc is generated which cancels the pulse-like noise Pa in a short time. FIG. 2(d) shows the high frequency error signal at that time, which is added with the low frequency error signal shown in FIG. 2(e), so that a control signal shown in FIG. 2(f) is applied to the drive circuit 10. As a result, the aforesaid extra energy supplied to the head 2 as shown in FIG. 2(g) is quickly cancelled to result in the tracking becoming stable.

In a case where the pulse-like noise is of an abnormally large energy, the actuator 11 may have had a larger position error prior to the cancellation of the speed error caused by the extra energy. In such a case, when the gain of the high-pass filter 8 is made larger than normal value so as to generate a cancel pulse which is somewhat largely as shown by the dotted line Pc' in FIG. 2(d), energy is fed to the actuator 11 in the direction of correcting the position error. As a result, as shown by the dotted line Qc' in FIG. 2(g), the head 2 which has been shifted by the pulse-like noises moves in the direction of cancelling the position error, thereby further stabilizing the tracking.

As seen from the above, the present invention allows stable tracking with respect to a defect on the information recording medium 1. In addition, in the above description, the defect detection means is not particularly defined, but, for example, may envelope-detect the reproduced signal to thereby detect a collapse in amplitude of the signal, or may detect whether the reproduced signal is larger in an interval between the zero-crossings than the predetermined length. Also, the reproducing head 2 is not particularly defined, but may be, for example, an optical information reading means or the so-called magnetic head.

Also, the aforesaid ground potential is not defined, but may be a virtual grounding point or an alternating-current grounding point. Alternatively, the high-pass filter 8 may use a reactor instead of the capacitor or may be a digital filter. In either case, the high-pass filter usually includes a storage element having the same storage function as the charge storage function of the capacitor, and outputs as a signal a variation in the storage quantity. Accordingly, the input to the high frequency pass filter 8 is controlled to cancel variation in the storage quantity caused by the pulse-like noise, thereby obtaining the effect of the invention. For example, in a case of using the reactor instead of the capacitor, the storage element stores a current with the reactor, or in a case of using the digital filter, the filter stores numerical values with an adder and register.

Figure 4:
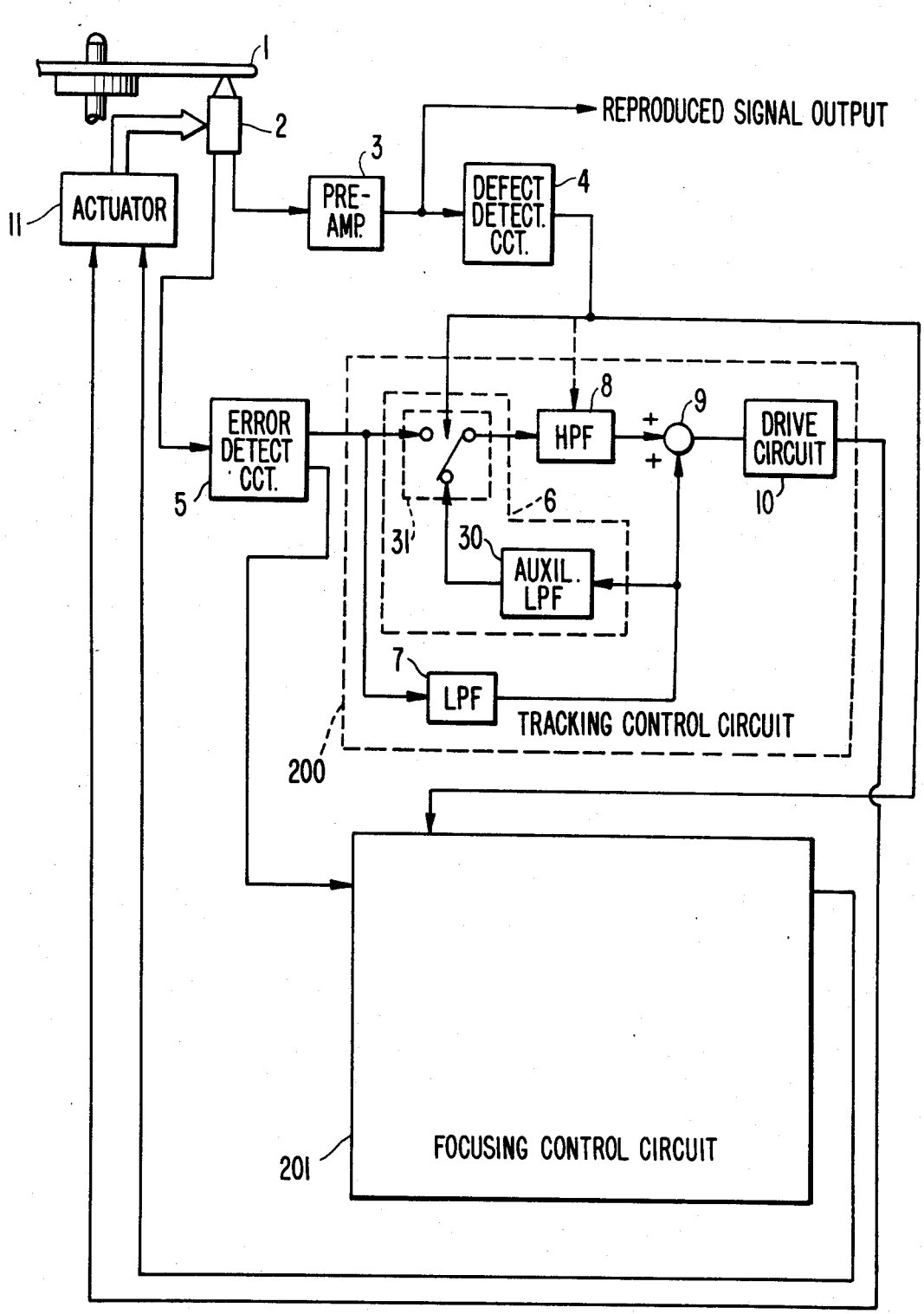
FIG. 4 is a block diagram of a modified embodiment of the information reproducing apparatus of the present invention.

Referring to FIG. 4, reference numeral 30 designates an auxiliary low-pass filter for further removing the pulse-like noises from the output of low-pass filter 7. The FIG. 4 embodiment operates in a fashion which is similar to the FIG. 1 embodiment, so that its detailed description will be omitted. But, in this embodiment, the input signal of the high-pass filter 8 is switched, in response to the defect detection signal, from the error signal outputted from the error detection circuit 5 to the input signal of auxiliary low-pass filter 30 by the use of a changeover switch 31. Since the output signal of the filter 30 has the pulse-like noises completely removed, if the gain of the passband is represented by 1 when the low-pass filter 7 is connected in series with the auxiliary low-pass filter 30, the storage quantity of the storage element included in the high-pass filter 8 changes to cancel variations caused by the pulse-like noises when the defect detection signal is switched to the output of the auxiliary low-pass filter 30. Therefore, in the same way as described in the FIG. 1 embodiment, it is possible to obtain the cancel pulse for cancelling the pulse-like noises.

Figure 5:
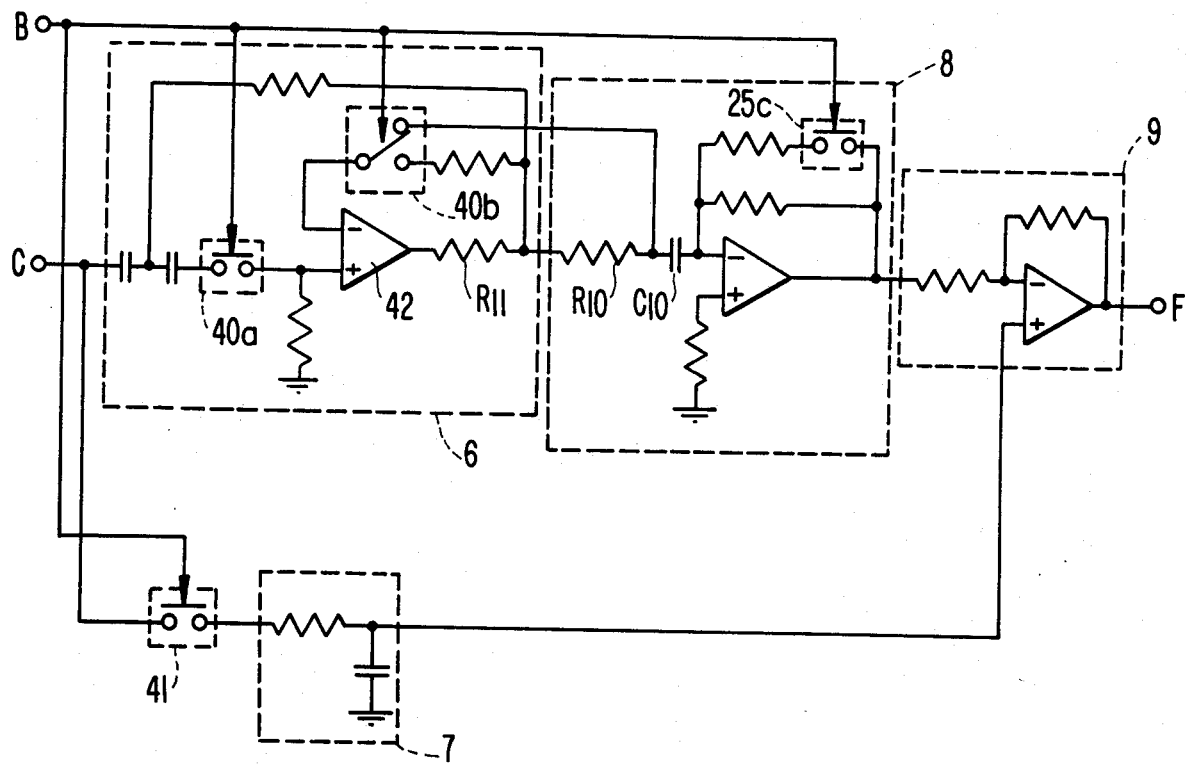
FIGS. 5 through 9 are circuit diagrams of the principal portions of position control means of other modified embodiments of the present invention.

Referring to FIG. 5, another modified embodiment of the invention is shown, in which when defect detection means detects the defect and a defect detection signal is outputted, an analog switch 40a is open and an analog switch 40b switches the feedback into the negative input terminal of operational amplifier 42 to the input terminal voltage of capacitor $C_{10}$. The operational amplifier 42 compares the input terminal voltage of capacitor $C_{10}$ with the ground potential and its output is saturated to cancel the difference. In other words, the difference between the input terminal voltage of capacitor $C_{10}$ and the grounding potential, is fed back (negative feedback) to the high-pass filter 8. Generally, since the charging voltage for the capacitor $C_{10}$ by the pulse-like noises is sufficiently small in comparison with the saturation voltage of operational amplifier 42, the capacitor $C_{10}$ discharges at nearly a constant current limited by resistors $R_{10}$ and $R_{11}$. Although the time constant of high-pass filter 8 is a predetermined value determined by the resistor $R_{10}$ and capacitor $C_{10}$, the amount of discharge current is determined by $R_{10}+R_{11}$. Therefore, the discharge current is predetermined by properly selecting the value of $R_{11}$. Thus, since the capacitor $C_{10}$ discharges at a nearly constant current, the pulse-like noises are removable by a cancel pulse of an approximately rectangular waveform. The larger the discharge current is, the shorter the discharge time is for cancelling the speed error of the actuator caused by the pulse-like noise. But when the discharge current is too large, the amplitude of the cancel pulse becomes too large, whereby the circuit functions non-linearly so as not to cancel ideally the pulse-like noises. In consideration of this, when the value of $R_{11}$ is properly decided, the cancel pulse to cancel the pulse-like noises in an extremely short time can be generated. When the value of $R_{11}$ becomes too large, the high-pass filter 8 may be provided with a control means for a rate of change of storage quantity, thereby enabling the optimum value of $R_{11}$ to be reduced.

An analog switch 41 is open in response to the defect detection signal and holds an output of the low-pass filter while the defect detection signal is being outputted. Hence, the tracking control is not so easily disturbed by the noises appearing in the error signal while reproducing the defective portion of the recording medium 1, thereby further improving the stability of tracking control.

Incidentally, the basic principle of this embodiment is the same as that of the FIG. 1 embodiment and a description herewith has been omitted.

Figure 6:
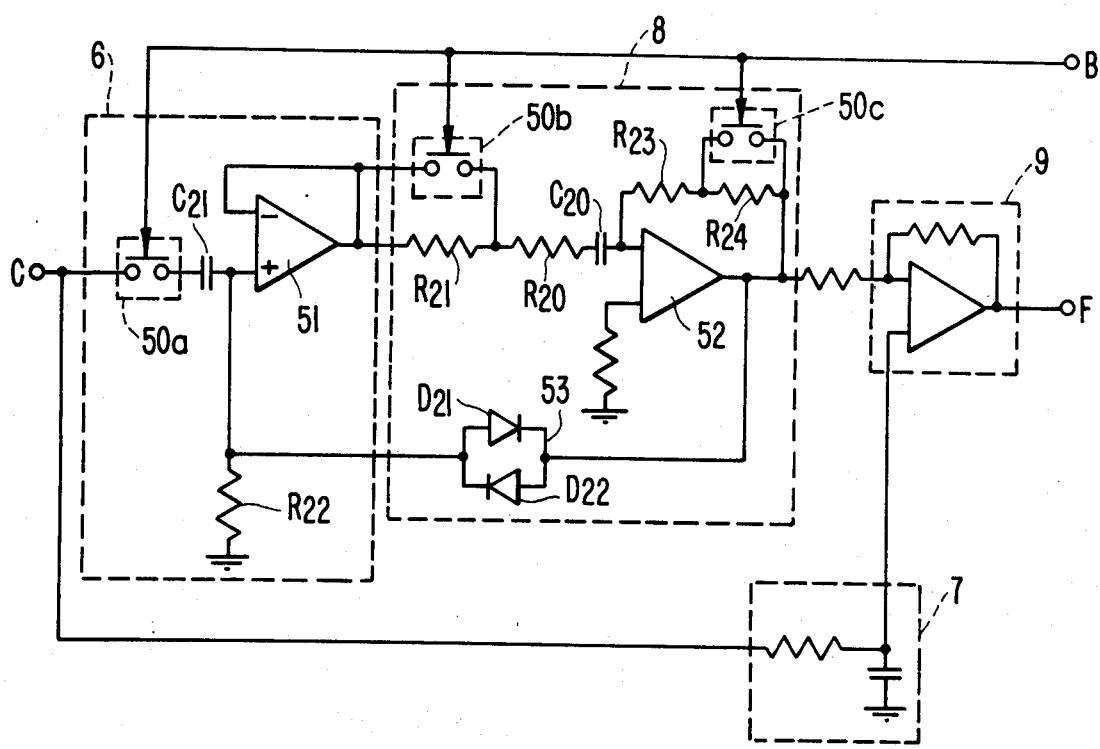

Referring to FIG. 6, the principal portion of the tracking control means of still another modified embodiment of the present invention is shown, in which a high-pass filter is provided with a storage quantity change rate control means 53.

In this embodiment, when the defect detection means detects the defect and the defect detection signal B is outputted, an analog switch 50a is open as shown and the input terminal voltage is fixed substantially to the ground potential, and simultaneously an analog switch 50b is closed to short circuit resistance 21 and reduce the time constant of high-pass filter 8 from $(R_{20}+R_{21}) \cdot C_{20}$ to $R_{20} \cdot C_{20}$. An analog switch 50c is open to increase by a factor of $(1+R_{24}/R_{23})$ the gain of the high-pass filter. From the above, it is understandable that diodes $D_{21}$ and $D_{22}$ are cut off in a range of a sufficiently small output amplitude of the operational amplifier 52 and this tracking control means operates almost like the circuit in FIG. 3. However, when the discharge current of capacitor $C_{20}$ exceeds a certain value, the output amplitude of operational amplifier 52 exceeds the bias voltage of diode $D_{21}$ or $D_{22}$, resulting in either the diode $D_{21}$ or $D_{22}$ being conductive so as to allow a current flow in the resistor $R_{22}$. Hence, the feedback is applied to the discharge current from the capacitor $C_{20}$ so that the output of operational amplifier 52 is lower than the bias voltage of diode. Also, since the feedback loop is given no external input because the analog switch 50a is open, the operational amplifier 52 has only its maximum amplitude reduced, so that the total quantity of energy output as the cancel pulse can be equal to the energy quantity when non-linear operation is not developed in the circuit and no feedback is carried out. Therefore, this embodiment is its same in the basic operation as the FIG. 5 embodiment.

Figure 7:
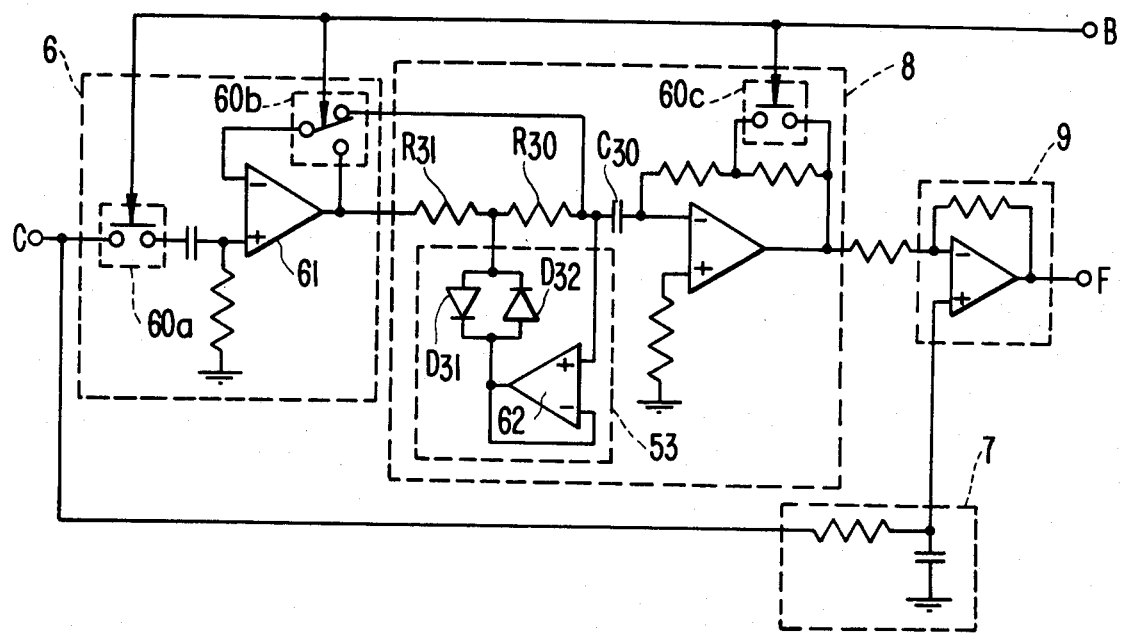
Figure 8:
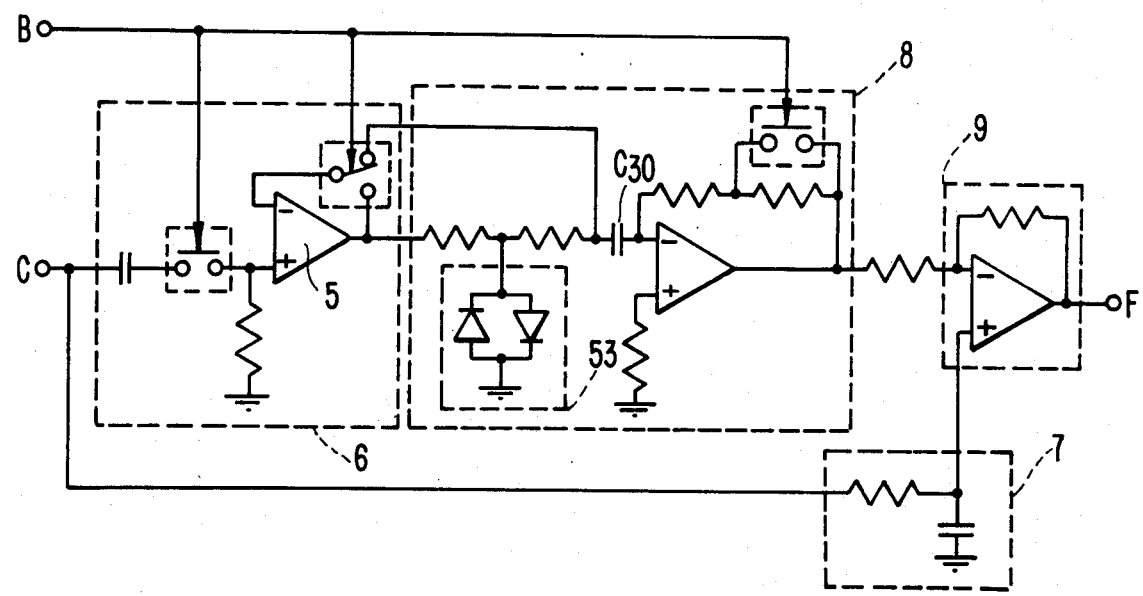

FIG. 7 shows a circuit diagram of the principal portion of the tracking control means of a further modified embodiment of the present invention, in which reference numerals 60a, 60b and 60c designate analog switches, and numerals 61 and 62 designate operational amplifiers respectively. In this embodiment, the input terminal at the capacitor $C_{30}$ is connected to the negative input terminal of the operational amplifier 61 so that the input of the high-pass filter is supplied with the feedback, thereby effectively reducing the time constant. Also, a signal throughput limit means comprising a diode limiter of an operational amplifier 62 and diodes $D_{31}$ and $D_{32}$, is used to detect a discharge current of capacitor $C_{30}$ from the potential difference across the terminals of resistor $R_{30}$ and suppresses the current value to be at most about $0.7/R_{30}(A)$. Accordingly, the effect and basic principle of this embodiment are the same as those of the FIG. 6 embodiment and an explanation herewith has been omitted. Also, even when the operational amplifier 62 is omitted as shown in FIG. 8, the potential difference across the terminals of the capacitor $C_{30}$ is often small, thereby obtaining the effect equivalent to that in the FIG. 7 embodiment.

Figure 9:
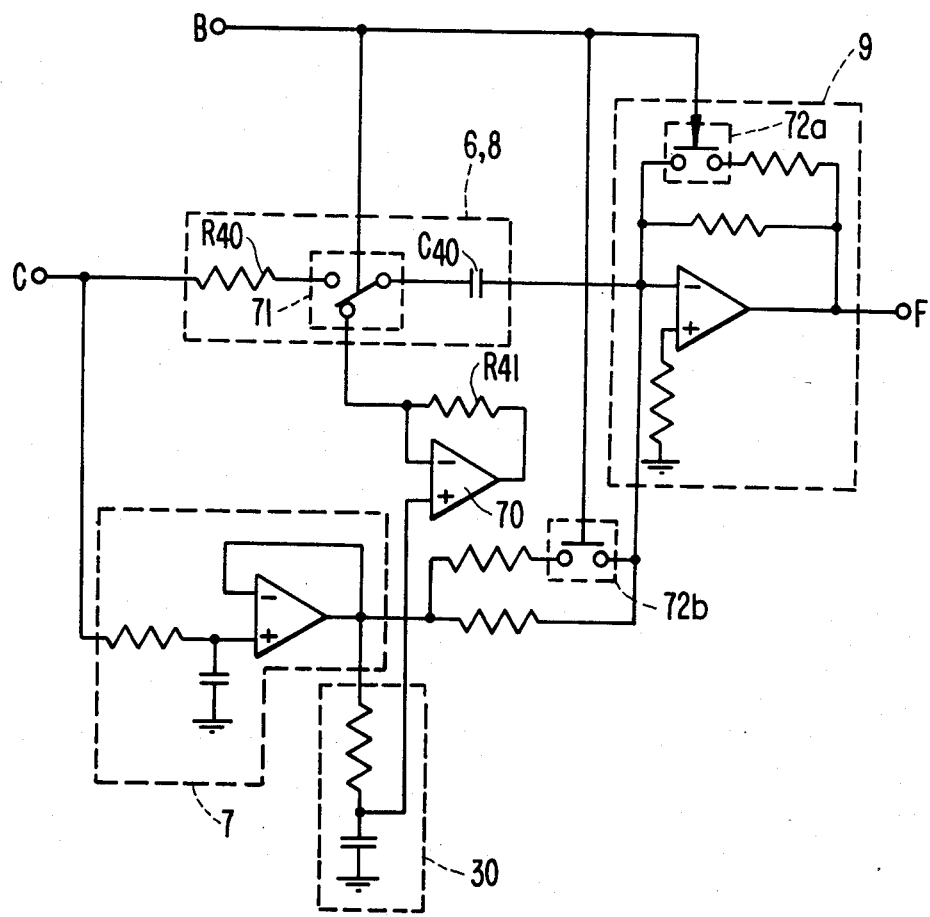

Referring to FIG. 9, the principal portion of the tracking control means of a still further embodiment of the present invention is shown, in which reference numeral 70 designates an operaftional amplifier, and numerals 71, 72a and 72b designate analog switches respectively. The analog switch 71 is adapted to switch, as shown, the input terminal of capacitor $C_{40}$ of a high-pass filter 8 in response to the defect detection signal, thereby allowing an output of the operational amplifier 70 to charge and discharge the capacitor $C_{40}$. The operational amplifier 70 compares the input terminal voltage of capacitor $C_{40}$ with an output of an auxiliary low-pass filter 30, and when a difference is found therebetween, is saturated to charge or discharge the capacitor $C_{40}$ in the direction of cancelling the difference. At this time a resistance $R_{41}$ limits the charge or discharge current of capacitor $C_{40}$, the resistance value $R_{41}$ being properly selected to enable an ideal cancel pulse to be generated. In other words, the analog switch 71, operational amplifier 70 and resistor $R_{41}$, constitute the storage quantity control means, which compares, in response to the defect detection signal, the stored charge quantity of capacitor $C_{40}$ with that when the pulse-like noise is assumed to be absent, so that a difference therebetween is fed back to the input of the high-pass filter 8. Also the storage quantity control means may be considered to switch the time constant of high-pass filter 8.

On the other hand, the analog switch 72a is open in response to the defect detection signal so as to integer-multiply the cancel pulse. Simultaneously, the analog switch 72b also is open to keep the gain constant with respect to the low frequency error signal.

The operational principle of the above has been detailed with respect to the FIGS. 1 and 4 embodiments, and has therefore been omitted herewith.

Now, in some cases, many defects continue for a short time before the tracking control means is fully static.

Generally, the response frequency of the tracking control means is often required to be set higher than the cutoff frequency of the high-pass filter. In such a case, when the aforesaid phenomenon occurs, there is a fear that a high frequency component due to a transient response for the tracking control to be essentially again fed in, is also offset by the cancel pulse.

Such a problem is solvable by providing a blocking means in the defect detection means for blocking the defect detection signal for a certain period after completion of the initial defect detection signal.

For the time period of the blocking of the defect detection signal, the tracking control means lowers in its open loop gain, whereby a disturbance in the tracking control means for the defective portion which is neglected due to the blocking of the defect detection signal can be restricted.

The open loop gain of the tracking control means, not particularly described, will hereinafter be assumed to be lowered while the blocking means is operating. The method for lowering the open loop gain, for example, may lower the gain of the drive circuit, or may provide an attenuator within the loop of tracking means for lowering the gain according to the output from the blocking means.

Figure 10:
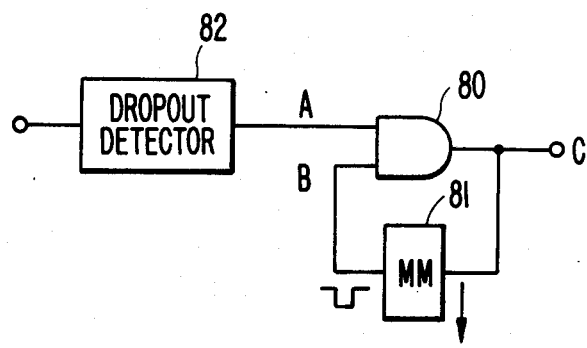
FIG. 10 is a block diagram of a blocking means used for the defect detection means in still another embodiment of the present invention.
Figure 11:
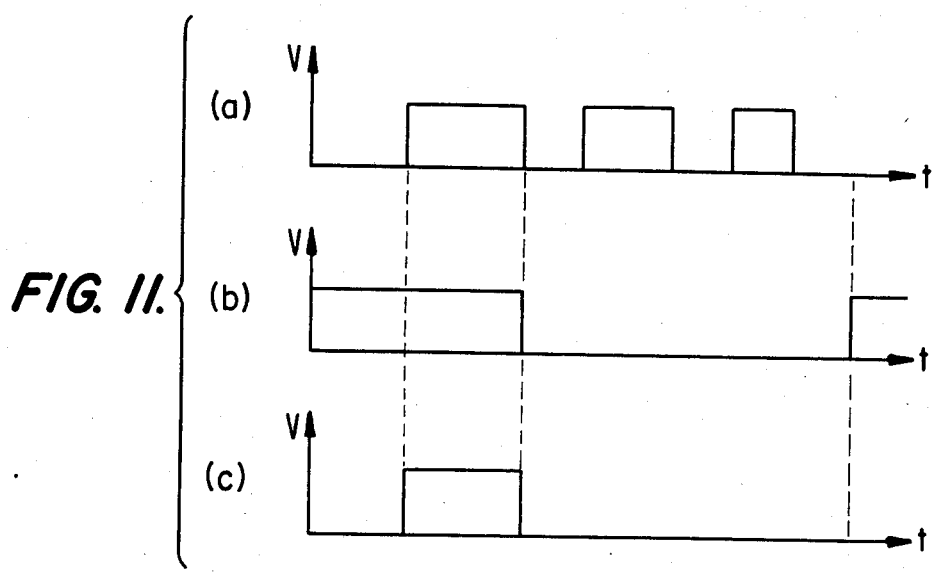
FIGS. 11($a$) through ($c$) are waveform charts of the components in the FIG. 10 block diagram respectively.

Next, referring to FIG. 10, waveforms of signals at the points A, B and C correspond to FIGS. 11(a), (b) and (c). FIG. 11(b) represents a defect detection signal outputted from a defect detection means or dropout detector 82, and an output of a monostable multivibrator 81 being assumed to always be kept at a logical "1". The dropout detector 82 detects the first defect of the information recording medium 1 and goes to logical "1" only for the time proportional to length of the defective portion. At this time, the output from the monostable multivibrator 81 is a logical "1", whereby the first defect detection signal directly passes to the output C of an AND gate. The monostable multivibrator 81, however, is triggered by an inversion of output C of the AND gate, and the output B keeps its logical "0" only for a predetermined time, thereby blocking the defect detection signal for the predetermined time after detection of the first defect.

Alternatively, being not particularly shown, even when the logic of the defect detection signal is inverted and the trigger edge of monostable multivibrator 81 is changed from the leading edge to the trailing edge and the AND gate is exchanged for a NOR gate, an output condition quite the same as the output C can be produced by the De Morgan theorem.

From the aforesaid construction, the tracking control is prevented from being disturbed by frequent shots of defect detection signals outputted at abnormally short intervals.

Figure 12:
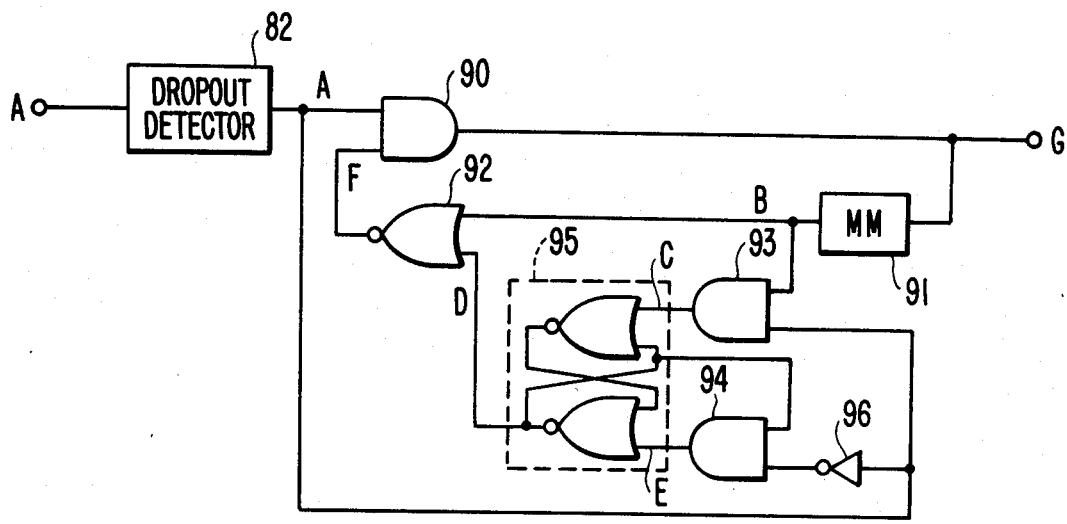
FIG. 12 is a block diagram of another blocking means used for a defect detection means in still another embodiment of the present invention.

FIGS. 13(a) through (g) represent wave forms at the points A through G in FIG. 12 respectively. In FIG. 12, a monostable multivibrator 91, when the defect detection signal (in FIG. 13(a)) at first rises, is triggered to begin to block an input from the terminal A through a NOR gate 92, at which time the given defect detection signal is blocked as, for example, $T_2$, so as not to appear at the output terminal G. Also, since an AND gate 93 is also open for the while, at the output terminal D of an RS flip-flop comprising NOR gates are developed waveforms which are the same as those $T_2$ and $T_3$ of the defect detection signal rising while the input terminal E is going to a logical "1". As the result of the NOR operation of the input signals to the terminals D and B, the AND gate 90 is open or closed, whereby the defect detection signal, which cannot be blocked only by the output $T_3$ from the monostable multivibrator 91 and which is outputted at the time when the output pulse of monostable multivibrator is over, can be completely blocked.

Therefore, it is possible to block the defect detection signal being outputted still at the time when the blocking operation finishes after the defect detection signal is blocked for a predetermined time period. Thus, it is possible to prevent an inconvenience such that the defect detection signal broken off in part by the blocking means does not accurately reflect the size of defect on the information recording medium 1 so that an accurate countermeasure cannot be taken which offsets, by the cancel pulse, the speed error of the actuator caused by the pulse-like noises.

Figure 14:
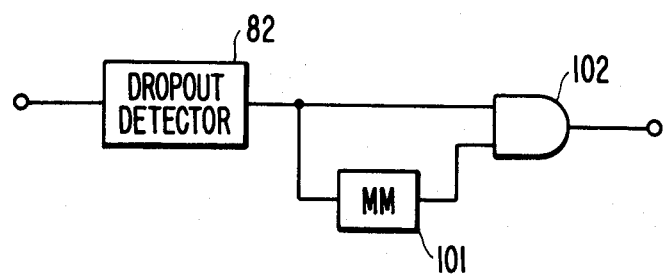
FIG. 14 is a block diagram of still another blocking means used for a defect detection means in a further modified embodiment of the present invention.
Figure 13:
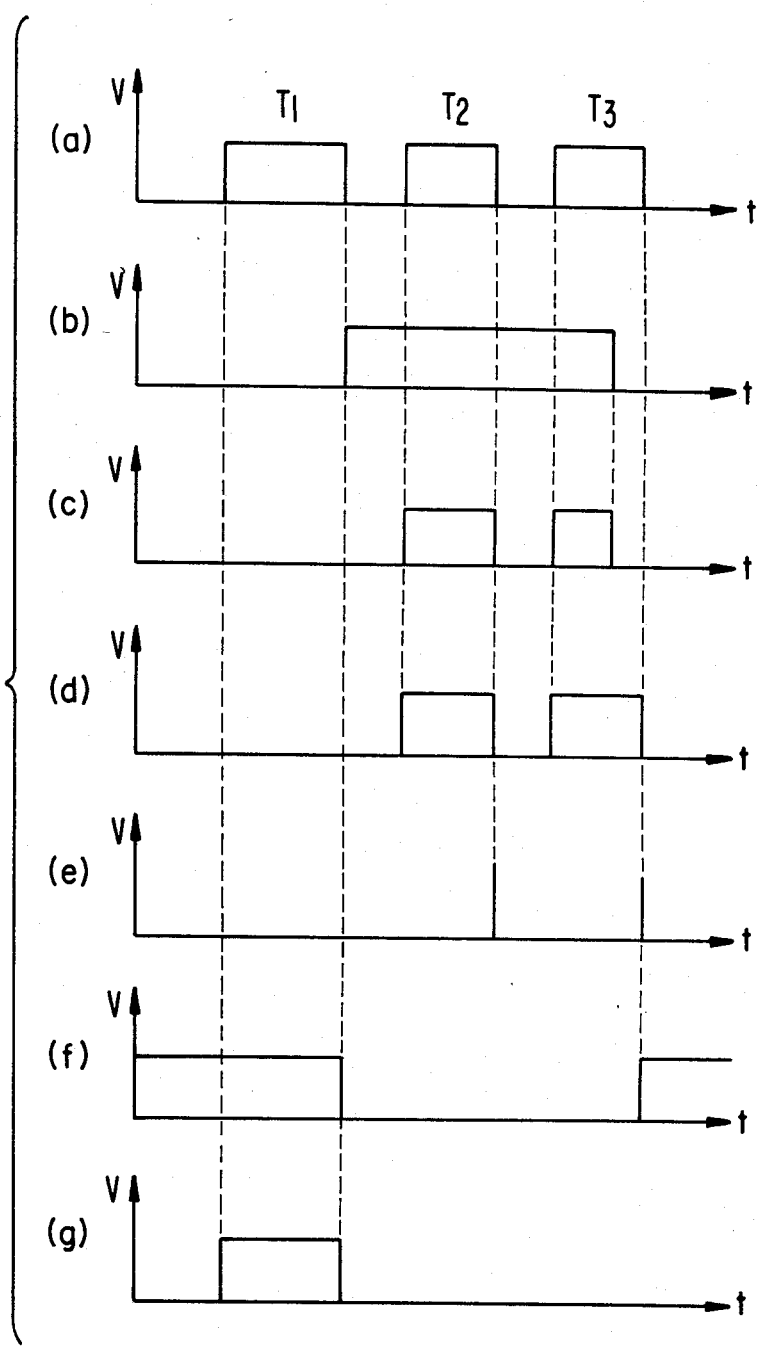
FIGS. 13($a$) through ($g$) are waveform charts of the components in the block diagram in FIG. 12.

Referring to FIG. 14, a monostable multivibrator 101 is triggered at the leading edge of an output from the dropout detector 82 to output the pulse of a logical "1" for the predetermined time period. The output pulse and the defect detection signal are subjected to an AND-operation by an AND gate 102, thereby preventing the defect detection signal from exceeding the predetermined time period. This means that, for example, the time period for holding is generally limited when the pulse is held in the tracking control loop, so that the reproducing head, when held much longer than it needs, is prevented from the difficulty in returning to the correct track.

As many apparently widely different embodiments of this invention may be made without departing from the spirit and scope thereof, it is to be understood that the invention is not limited to the specific embodiments thereof except as defined in the appended claims.

What is claimed is:

1. A tracking control system for an information reproducing apparatus comprising:
   an information reading means for reading information recorded on a concentric or spiral information track of an information recording medium;
   an actuator for actuating said information reading means;
   a defect detection means coupled to said information reading means for producing a defect detection signal when said information reading means passes a defective portion on said information recording medium;
   an error detection means coupled to said information reading means for producing an error signal indicating a position error of said information reading means for a position of said information track, a pulse noise being caused in said error signal at a time when said information reading means enters into said defective portion; and;
   a position control means responsive to said error signal for producing a drive signal for driving said actuator to control said information reading means to trace on said information track,
   wherein said position control means comprises:
      a high-pass filter which normally passes high frequency components of said error signal to obtain a high frequency error signal, a time constant of said high-pass filter being normally set so that an amount of a storage quantity of a storage element included therein varies corresponding to variations of said error signal;
      a low-pass filter which passes low frequency components of said error signal to obtain a low frequency error signal;
      an adding means for adding said high frequency error signal and said low frequency error signal;
      a drive means for producing said drive signal form an output signal of said adding means; and
      a storage quantity control means which is coupled between said error detection means and said high-pass filter for normally passing said error signal from said error detection means to said high-pass filter, said storage quantity control means being responsive to said defect detection signal for blocking said error signal and applying a predetermined level signal to said high-pass filter so that said high-pass filter, due to an abrupt variation in an amount of said storage quantity caused by said predetermined level signal, produces a cancel pulse signal by which an abnormal movement of said information reading means caused by said pulse noise is stopped.

2. A tracking system as set forth in claim 1, wherein said high-pass filter is responsive to said defect detection signal for reducing said time constant to a smaller value so that a duration of said cancel pulse signal is shortened to thereby reduce a time required for stopping said abnormal movement of said information reading means.

3. A tracking control system as set forth in claim 1, wherein said high-pass filter is responsive to said defect detection signal for increasing a gain of said high-pass filter so that an amplitude of said cancel pulse signal is increased to thereby move said information reading means in a direction opposite to said abnormal movement.

4. A tracking control system as set forth in claim 1, further comprising a blocking means coupled between said defect detection means and said position control means, wherein said blocking means, after passing a defect detection signal produced from said defect detection means, blocks another defect detection signal produced thereafter from said defect detection means during a predetermined time period from a trailing edge of the passed defect detection signal.

5. A tracking control system as set forth in claim 1, further comprising a blocking means coupled between said defect detection means and said position control means, wherein said blocking means passes a defect detection signal produced from said defect detection means, but, when said defect detection signal has a duration longer than a predetermined time period, blocks said defect detection signal after said predetermined time period has passed from a leading edge of said defect detection signal.

6. A tracking control system as set forth in claim 1, wherein said storage quantity control means has an auxiliary low-pass filter for eliminating pulse noises contained in said low frequency error signal from said low-pass filter, and a switch which normally applies said error signal form said error detection means to said high-pass filter and is responsive to said defect detection signal for applying an output signal of said auxiliary low-pass filter to said high-pass filter as said predetermined level signal.

7. A tracking control system as set forth in claim 1, wherein said storage quantity control means comprises a high-pass prefilter for eliminating low frequency components of said error signal applied to said high-pass filter, and a switch responsive to said defect detection signal for grounding an input of said high-pass prefilter so that the ground potential is applied to said high-pass filter as said predetermined level signal.

8. A tracking control system as set forth in claim 1, further comprising a negative feedback switch which is responsive to said defect detection signal for feeding said storage quantity of said storage element back to said high-pass prefilter so that a difference between amounts of said storage quantity before and after the input of said high-pass prefilter is grounded is applied to said high-pass filter.

9. A tracking control system as set forth in claim 1, wherein said high-pass filter includes means for restricting a signal quantity passing through said high-pass filter so as to be substantially lower than a predetermined level.

* * * * *